April 5, 1927.
H. W. MELLING
1,623,801
MILLING MACHINE
Filed Sept. 28, 1923
2 Sheets-Sheet 1
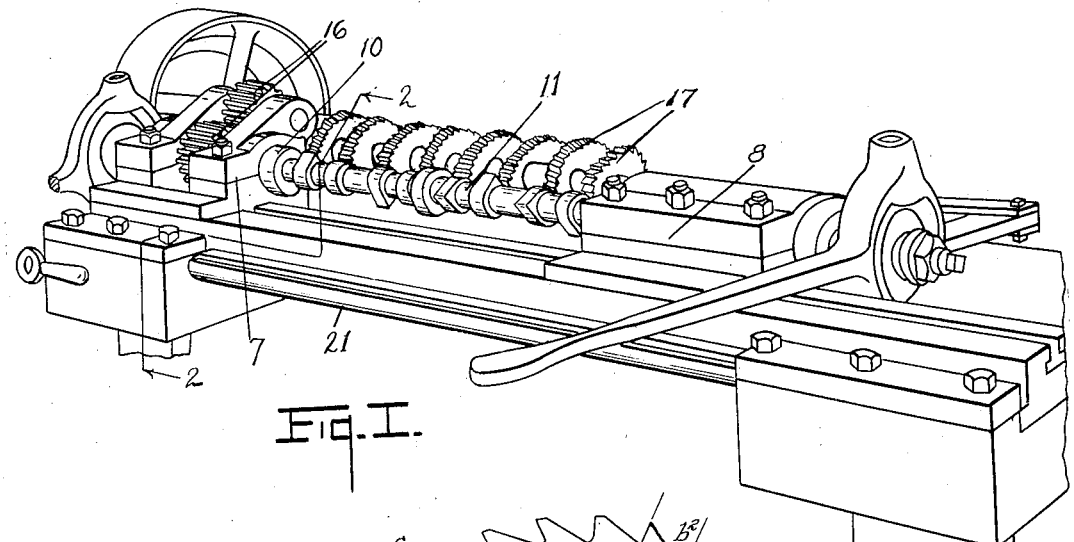
Fig. I.
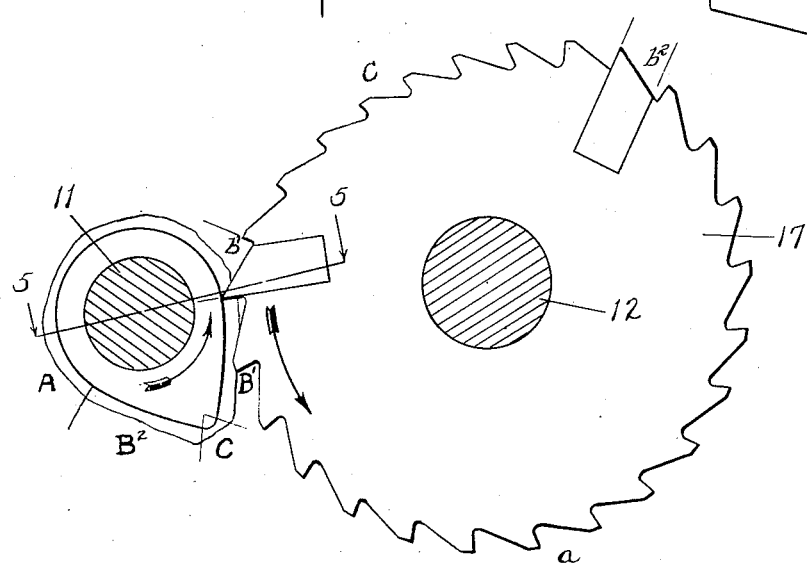
Fig. IV.
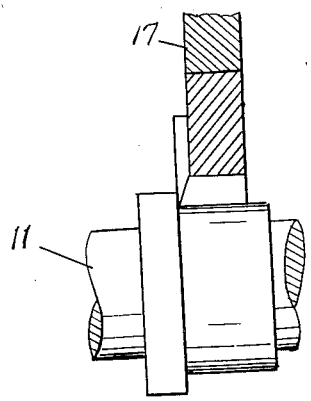
Fig. V.
Inventor
Herman W. Melling
By Chappell & Earl
Attorneys April 5, 1927.  H. W. MELLING  1,623,801
MILLING MACHINE
Filed Sept. 28, 1923  2 Sheets-Sheet 2
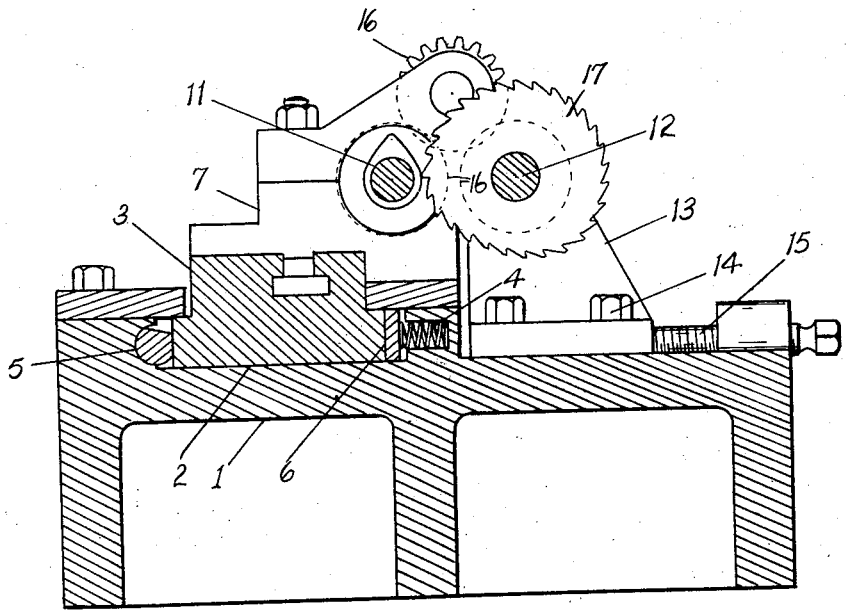
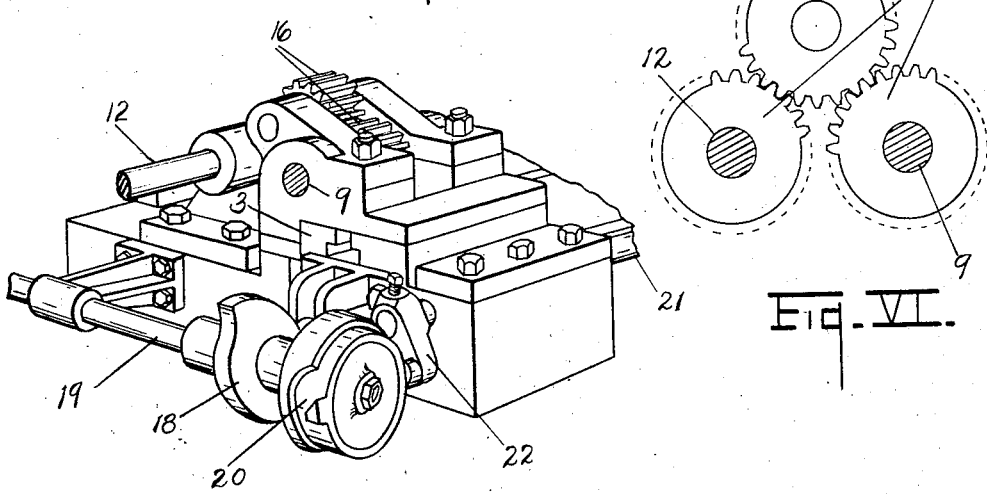
Inventor
Herman W. Melling
By Chappell Earl
Attorneys Patented Apr. 5, 1927.

1,623,801

UNITED STATES PATENT OFFICE.

HERMAN W. MELLING, OF JACKSON, MICHIGAN.

MILLING MACHINE.

Application filed September 28, 1923. Serial No. 665,348.

This invention relates to improvements in milling machines.

The main objects of this invention are:

First, to provide a machine for milling or machining cam shafts such as are used in internal combustion engines.

Second, to provide an improved milling machine for work of non-circular cross section.

Third, to provide an improved milling machine of the class described which is of large capacity.

Objects pertaining to details and economies of construction and operation of my improvements will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a front perspective view of a milling machine embodying the features of my invention, a portion of the frame being broken away.

Fig. II is a vertical transverse section on a line corresponding to line 2—2 of Fig. I.

Fig. III is a fragmentary front perspective view looking from the left of Fig. I.

Fig. IV is a vertical transverse section through the work and the cutter shaft showing the coacting relation of the cutter and work.

Fig. V is a detail view, partially in section, on a line corresponding to line 5—5 of Fig. IV.

Fig. VI is a detail section of the driving gears for the work spindle and cutter shaft.

In the drawing similar reference numerals indicate similar parts throughout the several views and the sectional views are taken looking in the direction of the little arrows at the ends of the section lines.

Referring to the drawing, the bed 1 is provided with a suitable way 2 for the carriage 3. The carriage is mounted on this way for longitudinal or forward movement and also for lateral adjustment to regulate the depth of cut so that a roughing cut and a finishing cut may be had, both movements of the carriage being on the single way 2.

The carriage is held yieldingly against its adjusting cams 5 by the springs 4, wear plates 6 being interposed between the springs and the carriage. A single spring and cam is illustrated. This cam is shaped to permit the carriage to move to neutral position, or to be adjusted to a roughing cut or a finishing cut. I have not in the accompanying drawing attempted to maintain the relative proportion of these parts.

The carriage is provided with a head stock 7 and a tail stock 8, the head stock having a live spindle 9 provided with a chuck shown conventionally at 10 for the work 11, the work illustrated being a cam shaft such as is used in internal combustion engines. This cam shaft has a plurality of cams disposed in a non-aligning relation.

The cutter shaft 12 is mounted on the bearing pedestals 13 supported in adjusted position by means of the bolts 14, adjusting screws 15 being provided for these bearing pedestals. The shaft 12 is connected to the live spindle 9 by means of a train of gears 16, the gearing being such that the spindle 9 and the shaft 12 are driven at the same speed and in the same direction.

The cutters 17 are mounted upon the shaft 12 in a spaced relation corresponding to that of the cams on the work so that the several cutters operate on the several cams as the work is carried along or fed by the feeding movement of the work carriage. This is effected, in the structure illustrated, by means of the cam 18 on the shaft 19, cams 20 being provided on the shaft 19 to actuate the shaft 21 of the cams 5, the shaft 21 having an arm 22 coacting with the cam 20.

In the structure illustrated the cams have circular portions A concentric with the axis of the shaft and lift portions comprising the parts $B^1$, $B^2$ and C. These lift portions are non-concentric with the axis of the work. The cutters 17 are complementary to the finished work, the cutters having portions $a$ concentric with the axis of the cutter shaft and portions $b^1$, $b^2$ and $c$ non-concentric therewith, the portions $b^1$ and $b^2$ being made up of a single inserted tooth. These teeth $b^1$ and $b^2$ have a lathe tool action cutting the parts $B^1$ and $B^2$ of the work. It is, therefore, desirable to provide the cutters with insertable teeth as more material is removed by these teeth than by the other teeth of the cutters.

In Figs. IV and V the work is shown with a cam partially cut, the stock commonly used for cam shafts being drop forgings which are roughly shaped. My improved machine removes the desired amount of stock and produces accurate shape or outline.

My improved milling machine is of large capacity and may be successfully operated by others than skilled mechanics.

I have illustrated and described my improvements in an embodiment which I find very practical. I have not attempted to illustrate or describe certain embodiments or adaptations which I contemplate as I believe the disclosure made will enable those skilled in the art to which my invention relates to embody or adapt the same as may be desired.

My Patent #1,569,518 issued Jan. 12, 1926, for milling machine, discloses certain of the features of this application.

Having thus described my invention what I claim as new and desire to secure by Letters Patent is:

1. The combination in a machine for machining work having a portion concentric to the axis of the work and a portion non-concentric therewith, of work supporting and driving means, a cutter of non-circular contour complementary to the work to be machined, said cutter having a portion concentric with its axis and a portion non-concentric therewith, and having inserted teeth between its concentric and non-concentric portions, and means for driving said cutter and work in synchronism.

2. The combination in a machine for machining work having a portion concentric to the axis of the work and a portion non-concentric therewith, a cutter of non-circular contour complementary to the work to be machined, said cutter having a portion concentric with its axis and a portion non-concentric therewith, and having inserted teeth between its concentric and non-concentric portions, and means for driving said cutter and work in synchronism.

3. In a structure of the class described, the combination of means for rotatably supporting work of non-circular contour, a milling cutter having a non-circular contour complementary to that of the work, and means for driving said work and cutter in synchronism and in the same direction, said cutter being provided with inserted teeth at the points where its contour changes.

4. The combination in a machine for machining cams having circular dwell portions concentric with the axis of the cam and lifts, the sides of which are non-concentric with the axis of the cam, a cutter having a non-circular contour comprising a portion concentric with the axis of the cutter and a portion non-concentric therewith and inserted blades between such portions, and means for driving said cutter and work at the same speed and in the same direction.

5. The combination in a machine for machining cams having circular dwell portions concentric with the axis of the cams and lifts, the sides of which are non-concentric with the axis of the cam, a cutter having a non-circular contour comprising a portion concentric with the axis of the cutter and a portion non-concentric therewith and inserted blades between such portions, and means for driving said cutter and work in synchronism.

6. In a structure of the class described, the combination of means for rotatably supporting work of non-circular contour, a milling cutter having a non-circular contour and provided with inserted teeth at the points where its contour changes, and means for driving the work and cutter in synchronism.

7. The combination in a machine for machining cams having lifts non-concentric with the axis of the cam, of a cutter having a peripheral portion of non-circular contour complementary to that of the lift of the work, said cutter having inserted blades at the ends of its said complementary portion, and means for driving said cutter and the work in synchronism and in the same direction.

8. The combination in a machine for machining cams having lifts non-concentric with the axis of the cam, of a cutter having a peripheral portion of non-circular contour complementary to that of the lift of the work, said cutter having inserted blades at the ends of its said complementary portion, and means for driving said cutter and the work in synchronism.

In witness whereof, I have hereunto set my hand.

HERMAN W. MELLING.